(12) United States Patent
Farrahi et al.

(10) Patent No.: US 11,501,044 B1
(45) Date of Patent: Nov. 15, 2022

(54) SYSTEM AND METHOD FOR DECOUPLING CAPACITOR SELECTION AND PLACEMENT USING GENETIC OPTIMIZATION

(71) Applicant: Cadence Design Systems, Inc., San Jose, CA (US)

(72) Inventors: Shirin Farrahi, Lincoln, MA (US); Yang Lu, San Jose, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 17/132,943

(22) Filed: Dec. 23, 2020

(51) Int. Cl.
*G06F 30/30* (2020.01)
*G06F 30/323* (2020.01)
*G06F 30/337* (2020.01)
*G06F 30/327* (2020.01)
*G06F 30/20* (2020.01)

(52) U.S. Cl.
CPC ............ *G06F 30/323* (2020.01); *G06F 30/20* (2020.01); *G06F 30/327* (2020.01); *G06F 30/337* (2020.01)

(58) Field of Classification Search
CPC .... G06F 30/323; G06F 30/327; G06F 30/337; G06F 30/20

USPC ......................................................... 716/103
See application file for complete search history.

(56) References Cited

U.S. PATENT DOCUMENTS

| | | | | |
|---|---|---|---|---|
| 6,637,008 | B1 * | 10/2003 | Higuchi | G06N 3/126 716/132 |
| 7,107,200 | B1 * | 9/2006 | Korobkov | G06F 30/3312 703/13 |
| 2007/0234245 | A1 * | 10/2007 | Nguyen | G06F 30/30 716/113 |

* cited by examiner

*Primary Examiner* — Jack Chiang
*Assistant Examiner* — Brandon Bowers
(74) *Attorney, Agent, or Firm* — Mark H. Whittenberger, Esq.; Holland & Knight LLP

(57) ABSTRACT

Embodiments include herein are directed towards a method for use in an electronic design environment is provided. Embodiments may include receiving a netlist associated with an electronic design and performing genetic optimization on a portion of the netlist to identify and place one or more capacitors on a printed circuit board to minimize an impedance associated with a power plane. Embodiments may further include displaying, at a graphical user interface, a placement of the one or more capacitors, wherein the placement is based upon, at least in part, the performing.

18 Claims, 11 Drawing Sheets

400

IMPORT DESIGN AND CONSTRAINTS
402

COMPONENT PLACEMENT
404

VIA PLACEMENT
406

ROUTING
406

FIG. 4

| Parameter | unit | meaning | example |
|---|---|---|---|
| Lx | meter | x direction size of power planes | 0.2 |
| Ly | meter | y direction size of power planes | 0.1 |
| d | meter | distance between power layer and ground layer | 2e-4 |
| t | meter | thickness of metal | 3e-5 |
| epsr | unitless | relative permittivity of insulator | 4.0 |
| mu_r_ins | unitless | relative permeability of insulator | 1.0 |
| mu_r_metal | unitless | relative permeability of metal | 1.0 |
| sig | S/m | conductivity of metal | 5.96e7 |
| loss_tan | unitless | loss tangent of dielectric | 0.02 |
| freqs | Hz | all frequencies of interests | [3.7e8, 7.5e8, 1.1e9, 2.0e9] |
| cutouts | meter | Polygon vertex coordinates(CCW) for each cutout of the power plane, in the form of [ [x1,y1,x2,y2,...,xn,yn,x1,y1], ... ]. List of list. For grouping problem, we usually assume uniform power/ground plane, so can leave it empty | [] |

FIG. 6

| Parameter | unit | meaning | example |
|---|---|---|---|
| cap_lib | [F, H, Ohm] | C,L,R values for each capacitor type, list of list | [[1e-6, 0.6e-9, 4e-3], [1e-12, 0.5 1e-9, 40]] |
| dx_caps | meter | Grid size for decaps placement, in x dir | 0.005 |
| dy_caps | meter | Grid size for decaps placement, in y dir | 0.005 |
| cand_region | meter | Polygon vertex coordinates(CCW) for each candidate region where you want to place decaps, in the form of [ [x1,y1,x2,y2...,xn, yn, x1,y1], ... ]. List of list | [ [0.005,0.005, 0.195,0.005, 0.195,0.095, 0.005,0.095, 0.005,0.005] ] |
| cand_region_exclude | meter | Polygon vertex coordinates(CCW) for each region where you want to exclude decaps, in the form of [ [x1,y1,x2,y2..., xn, yn, x1,y1], ... ]. List of list | [ [0.03,0.03, 0.07,0.03, 0.07,0.07, 0.03,0.07, 0.03,0.03], [0.12,0.02, 0.14,0.02, 0.14,0.04, 0.12,0.04, 0.12,0.02], [0.16,0.06, 0.18,0.06, 0.18,0.08, 0.16,0.08, 0.16,0.06] ] |
| cent_component | meter | The central component bounding box [x1, y1, x2, y2], optional, only needed where you want to group decaps around it | [0.3, 0.3, 0.7, 0.7] |
| pins | meter | Coordinates of all power pins, whose input impedance will be optimized, list of [x,y] pairs | [[0.03,0.03], [0.07,0.03], [0.07,0.07], [0.03,0.07], [0.12,0.02], [0.14,0.02], [0.14,0.04], [0.12,0.04], [0.16,0.06], [0.18,0.06], [0.18,0.08], [0.16,0.08]] |
| Ztar | ohm | Target impedance for all the pins at each frequency, list of list [ [z1_f1, z2_f1...], [z1_f2, z2_f2...] ...] | [ [0.5, 0.5, 0.5, 0.5, 0.5, 0.5, 0.5, 0.5, 0.5, 0.5, 0.5, 0.5], [0.5, 0.5, 0.5, 0.5, 0.5, 0.5, 0.5, 0.5, 0.5, 0.5, 0.5, 0.5], [0.5, 0.5, 0.5, 0.5, 0.5, 0.5, 0.5, 0.5, 0.5, 0.5, 0.5, 0.5], [0.5, 0.5, 0.5, 0.5, 0.5, 0.5, 0.5, 0.5, 0.5, 0.5, 0.5, 0.5] ] |

FIG. 7

| Parameter | unit | meaning | example |
|---|---|---|---|
| params_go | N/A | Genetic optimizer parameters, it's a dictionary | params_go = { 'num_caps': 25, 'num_pop': 150, 'max_gen': 30, 'xcpb': 0.2, 'mtpb': 0.8, 'indpb_xc': 0.3, 'indpb_mt_c': 0.1, 'indpb_mt_pos': 0.3, 'tournsize': 5 } |

FIG. 8

SYSTEM AND METHOD FOR DECOUPLING CAPACITOR SELECTION AND PLACEMENT USING GENETIC OPTIMIZATION

FIELD OF THE INVENTION

The present disclosure relates to genetic optimization, and more specifically, to genetic optimization applied to placement of decoupling capacitors.

DISCUSSION OF THE RELATED ART

As multi-layer Printed Circuit Boards (PCBs) have become increasingly common and as Electronic Design Automation (EDA) tools have necessarily become more aware of complex designs, the problem of routing under stricter conditions has pivoted. Engineers must be aware of more specific design considerations such as signal and power integrity, EMI issues, high speed constraints, low latency, cost, etc. while EDA software must also understand these multifaceted and often related issues. Historically, PCB design engineers have decried automatic placement and routing tools as unprofessional, often faulty, and a crutch for those without industry knowledge.

Decoupling capacitors are used in PCB designs to lower power rails' impedance and improve their noise immunity. The selection and placement of these decoupling capacitors often involves a lengthy iterative simulation process.

SUMMARY

In one or more embodiments of the present disclosure, a computer-implemented method for use in an electronic design environment is provided. The method may include receiving a netlist associated with an electronic design and performing genetic optimization on a portion of the netlist to identify and place one or more capacitors on a printed circuit board to minimize an impedance associated with a power plane. Embodiments may further include displaying, at a graphical user interface, a placement of the one or more capacitors, wherein the placement is based upon, at least in part, the performing.

One or more of the following features may be included. The method may include performing includes identifying a number, a value, and/or a location of the one or more capacitors. Performing genetic optimization may include iteratively adjusting a location of the one or more capacitors. Performing genetic optimization may include iteratively adjusting a type of the one or more capacitors. The method may further include displaying includes displaying a plurality of placement options at the graphical user interface. Performing may utilize at least one of a fast field solver and a robust matrix solver. The method may also include defining one or more port locations associated with the electronic design based upon, at least in part, a coordinate grid.

In one or more embodiments of the present disclosure a computer-readable storage medium having stored thereon instructions, which when executed by a processor result in one or more operations is provided. Operations may further include receiving a netlist associated with an electronic design and performing genetic optimization on a portion of the netlist to identify and place one or more capacitors on a printed circuit board to minimize an impedance associated with a power plane. Operations may further include displaying, at a graphical user interface, a placement of the one or more capacitors, wherein the placement is based upon, at least in part, the performing.

One or more of the following features may be included. Operations may include performing includes identifying a number, a value, and/or a location of the one or more capacitors. Performing genetic optimization may include iteratively adjusting a location of the one or more capacitors. Performing genetic optimization may include iteratively adjusting a type of the one or more capacitors. Operations may further include displaying includes displaying a plurality of placement options at the graphical user interface. Performing may utilize at least one of a fast field solver and a robust matrix solver. Operations may also include defining one or more port locations associated with the electronic design based upon, at least in part, a coordinate grid.

In one or more embodiments of the present disclosure, a system for use in an electronic design environment is provided. The system may include at least one processor configured to receive a netlist associated with an electronic design. The at least one processor may be further configured to perform genetic optimization on a portion of the netlist to identify and place one or more capacitors on a printed circuit board to minimize an impedance associated with a power plane. The at least one processor may be further configured to display, at a graphical user interface, a placement of the one or more capacitors, wherein the placement is based upon, at least in part, the performing.

One or more of the following features may be included. Performing may include identifying a number of the one or more capacitors.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

FIG. 4 is a flowchart depicting operations consistent with the placement process in accordance with an embodiment of the present disclosure;

FIG. 6 is a table showing various parameters consistent with the placement process in accordance with an embodiment of the present disclosure;

FIG. 7 is another table showing various parameters consistent with the placement process in accordance with an embodiment of the present disclosure;

FIG. 8 is yet another table showing various parameters consistent with the placement process in accordance with an embodiment of the present disclosure;

DETAILED DESCRIPTION

Embodiments of the present disclosure are directed towards a placement process that may be used to automatically determine the appropriate placement of one or more decoupling capacitors. In order, to improve a power rail's noise immunity, the power rail impedance should be as flat as possible and below a target impedance value. Accordingly, adding decoupling capacitors between the power rail and ground is an inexpensive method of lowering the power rail's impedance. Optimizing the number, value, and location of these capacitors has traditionally been a complex problem that can take a significant amount of time for a PCB designer to complete. Embodiments included herein address these problems as the described placement process utilizes genetic optimization to select and place one or more decoupling capacitors on a PCB without requiring any setup or interaction by the user.

Reference will now be made in detail to the embodiments of the present disclosure, examples of which are illustrated in the accompanying drawings. The present disclosure may, however, be embodied in many different forms and should not be construed as being limited to the embodiments set forth herein. Rather, these embodiments are provided so that this disclosure will be thorough and complete, and will fully convey the concept of the disclosure to those skilled in the art.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

With the rise in complexity and increased demand of consumer and industrial electronics, EDA tools and engineers have been stressed to their limits to produce quality designs on shorter and shorter timescales. To meet this increased demand and design expectations, engineers have been tasked to develop models to automate PCB placement and routing procedures using machine learning and artificial intelligence techniques. In the field of PCB routing, many subtasks have characteristics suitable for AI/ML optimization techniques due to the size of the design space/dimensionality of the problem. These approaches are particularly useful when a local optimal solution is acceptable, rather than a global optimal solution. Decoupling capacitor placement is a crucial problem to be solved and integrated into EDA applications or platforms.

Figure 1:
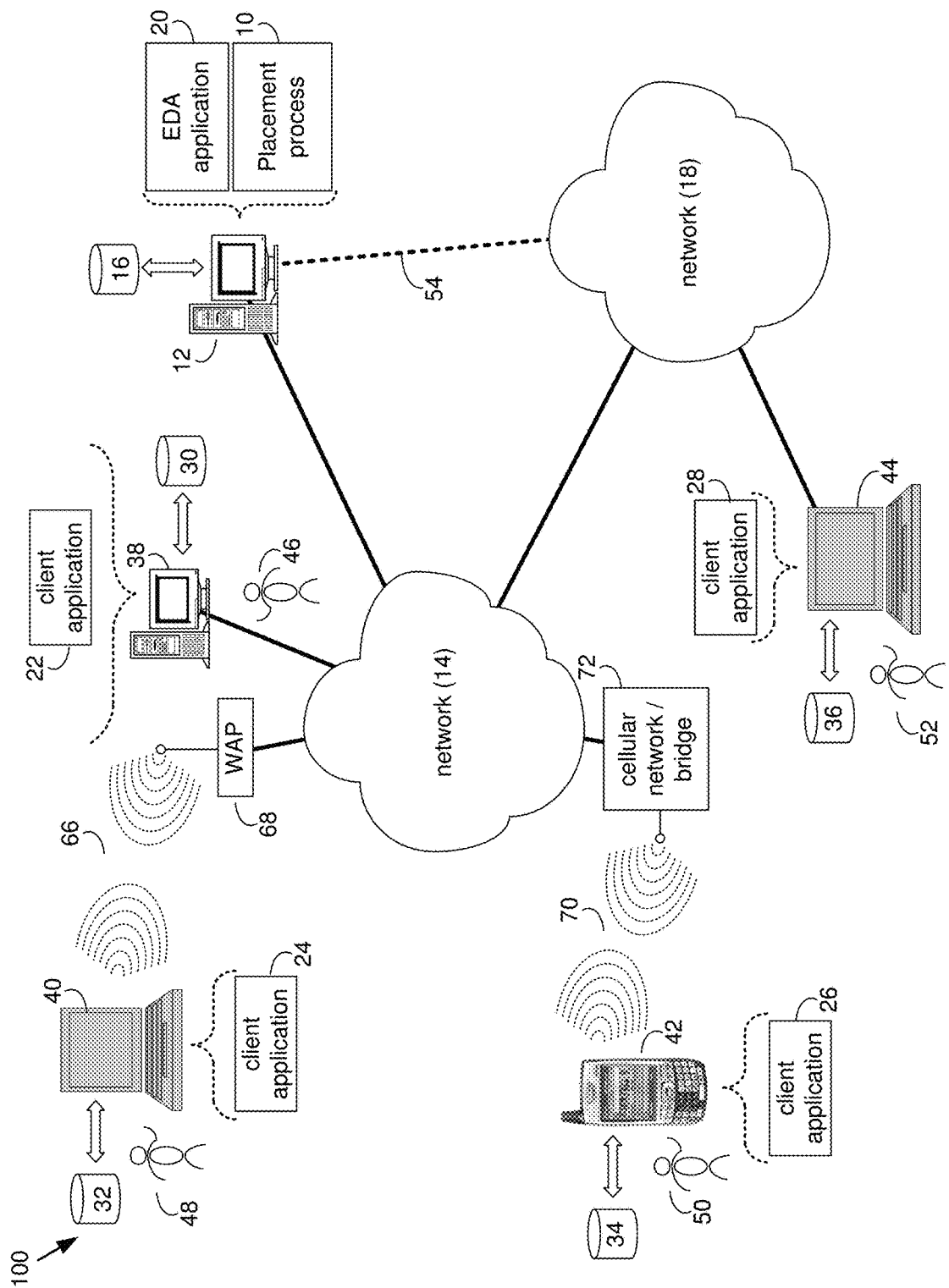
FIG. 1 is a diagram depicting an embodiment of a system in accordance with the present disclosure.

Referring to FIG. 1, there is shown a placement process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® Server; Novell® NetWare®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.) Additionally/alternatively, placement process 10 may reside on and be executed, in whole or in part, by a client electronic device, such as a personal computer, notebook computer, personal digital assistant, or the like.

The instruction sets and subroutines of the placement process 10, which may include one or more software modules, and which may be stored on storage device 16 coupled to server computer 12, may be executed by one or more processors (not shown) and one or more memory modules (not shown) incorporated into server computer 12. Storage device 16 may include but is not limited to: a hard disk drive; a solid state drive, a tape drive; an optical drive; a RAID array; a random access memory (RAM); and a read-only memory (ROM). Storage device 16 may include various types of files and file types including but not limited, to hardware description language (HDL) files, which may contain the port type descriptions and executable specifications of hardware blocks.

Server computer 12 may execute a web server application, examples of which may include but are not limited to: Microsoft IIS, Novell Webserver™, or Apache® Webserver, that allows for HTTP (e.g., HyperText Transfer Protocol) access to server computer 12 via network 14 (Webserver is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include but are not limited to: a local area network; a wide area network; or an intranet, for example. It should be noted that any or all of the operations associated with placement process 10 may occur, either in whole or in part, in the cloud as part of a cloud computing architecture.

Server computer 12 may execute an electronic design automation (EDA) application (e.g., EDA application 20), examples of which may include, but are not limited to those available from the assignee of the present application. EDA application 20 may interact with one or more EDA client applications (e.g., EDA client applications 22, 24, 26, 28) for electronic design optimization.

Placement process 10 may be a stand alone application, or may be an applet/application/script that may interact with and/or be executed within EDA application 20. In addition/ as an alternative to being a server-side process, the placement process may be a client-side process (not shown) that may reside on a client electronic device (described below) and may interact with an EDA client application (e.g., one or more of EDA client applications 22, 24, 26, 28). Further, the placement process may be a hybrid server-side/client-side process that may interact with EDA application 20 and an EDA client application (e.g., one or more of client applications 22, 24, 26, 28). As such, the processes may reside, in whole, or in part, on server computer 12 and/or one or more client electronic devices.

The instruction sets and subroutines of EDA application 20, which may be stored on storage device 16 coupled to server computer 12 may be executed by one or more processors (not shown) and one or more memory modules (not shown) incorporated into server computer 12.

The instruction sets and subroutines of EDA client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 may include but are not limited to: hard disk drives; solid state drives, tape drives; optical drives; RAID arrays; random access memories (RAM); read-only memories (ROM), compact flash (CF) storage devices, secure digital (SD) storage devices, and a memory stick storage devices. Examples of client electronic devices 38, 40, 42, 44 may include, but are not limited to, personal computer 38, laptop computer 40, mobile computing device 42 (such as a smart phone, netbook, or the like), notebook computer 44, for example. Using client applications 22, 24, 26, 28, users 46, 48, 50, 52 may access EDA application 20 and may allow users to e.g., utilize placement process 10.

Users 46, 48, 50, 52 may access EDA application 20 directly through the device on which the client application (e.g., client applications 22, 24, 26, 28) is executed, namely client electronic devices 38, 40, 42, 44, for example. Users 46, 48, 50, 52 may access EDA application 20 directly through network 14 or through secondary network 18. Further, server computer 12 (e.g., the computer that executes EDA application 20) may be connected to network 14 through secondary network 18, as illustrated with phantom link line 54. Some or all of the operations discussed herein with regard to placement process 10 may be performed, in whole or in part, in the cloud as a cloud-based process including, for example, networks 14, 18 and any others.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 66 established between laptop computer 40 and wireless access point (e.g., WAP) 68, which is shown directly coupled to network 14. WAP 68 may be, for example, an IEEE 802.11a, 802.11b, 802.11g, Wi-Fi, and/or Bluetooth device that is capable of establishing wireless communication channel 66 between laptop computer 40 and WAP 68. Mobile computing device 42 is shown wirelessly coupled to network 14 via wireless communication channel 70 established between mobile computing device 42 and cellular network/bridge 72, which is shown directly coupled to network 14.

As is known in the art, all of the IEEE 802.11x specifications may use Ethernet protocol and carrier sense multiple access with collision avoidance (e.g., CSMA/CA) for path sharing. The various 802.11x specifications may use phase-shift keying (e.g., PSK) modulation or complementary code keying (e.g., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows, Microsoft Windows CE®, Red Hat Linux, or other suitable operating system. (Windows CE is a registered trademark of Microsoft Corporation in the United States, other countries, or both).

Figure 2:
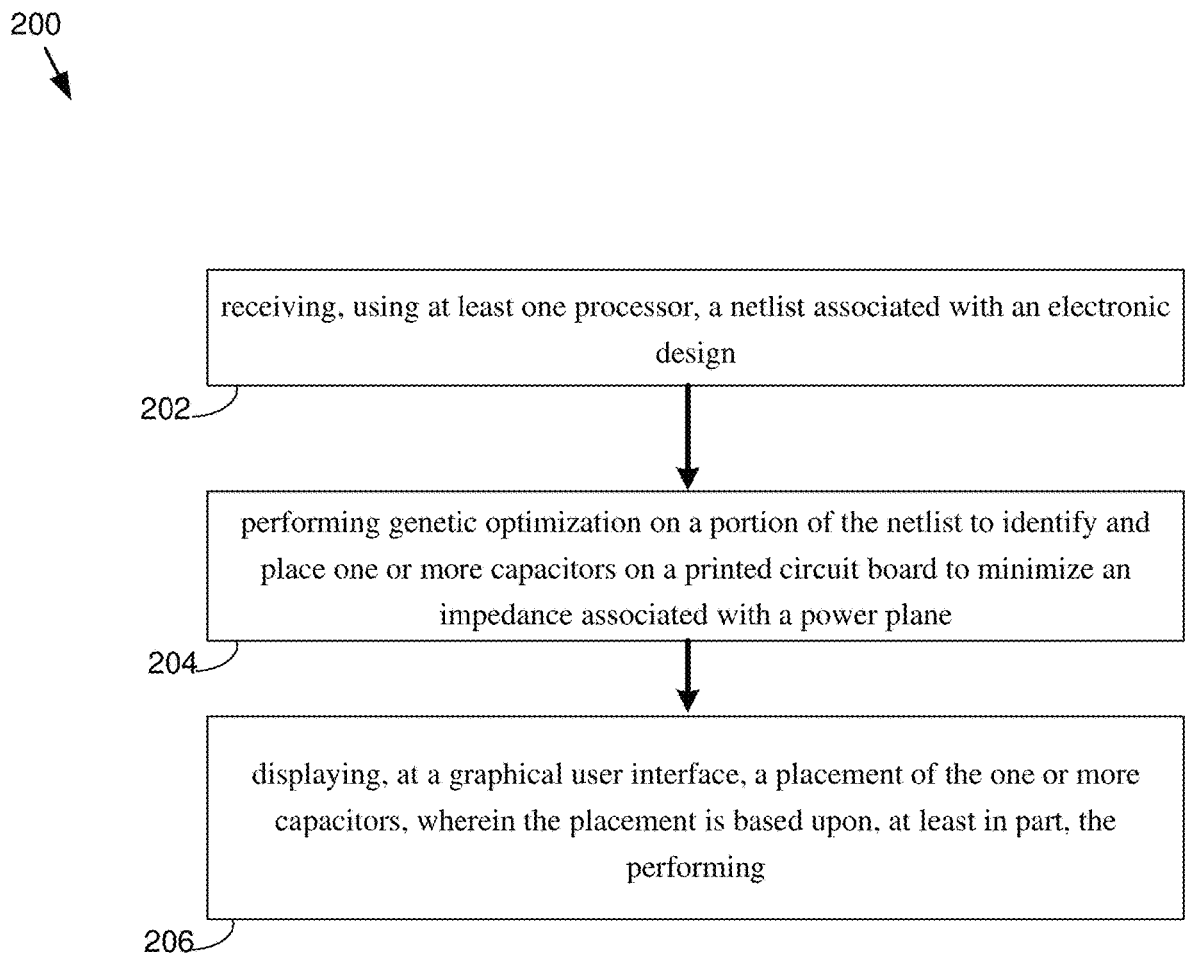
FIG. 2 is a flowchart depicting operations consistent with the placement process in accordance with an embodiment of the present disclosure.

Referring now to FIG. 2, an example flowchart depicting operations consistent with an embodiment of placement process 10 is provided. Placement process 10 may apply genetic optimization to a routing strategy associated with an electronic design. The process may include receiving (202), using a processor, a netlist associated with an electronic design and performing (204) genetic optimization on a portion of the netlist to identify and place one or more capacitors on a printed circuit board to minimize an impedance associated with a power plane. Embodiments may further include displaying (206), at a graphical user interface, a placement of the one or more capacitors, wherein the placement is based upon, at least in part, the performing. Numerous other operations are also within the scope of the present disclosure.

The teachings of the present disclosure may be used to decrease design synthesis time, and to produce faster design testing. However, final integration and optimization for large designs are still challenges. Other applications include genetic optimization applied to placement, new metrics, and design space exploration.

Figure 3:
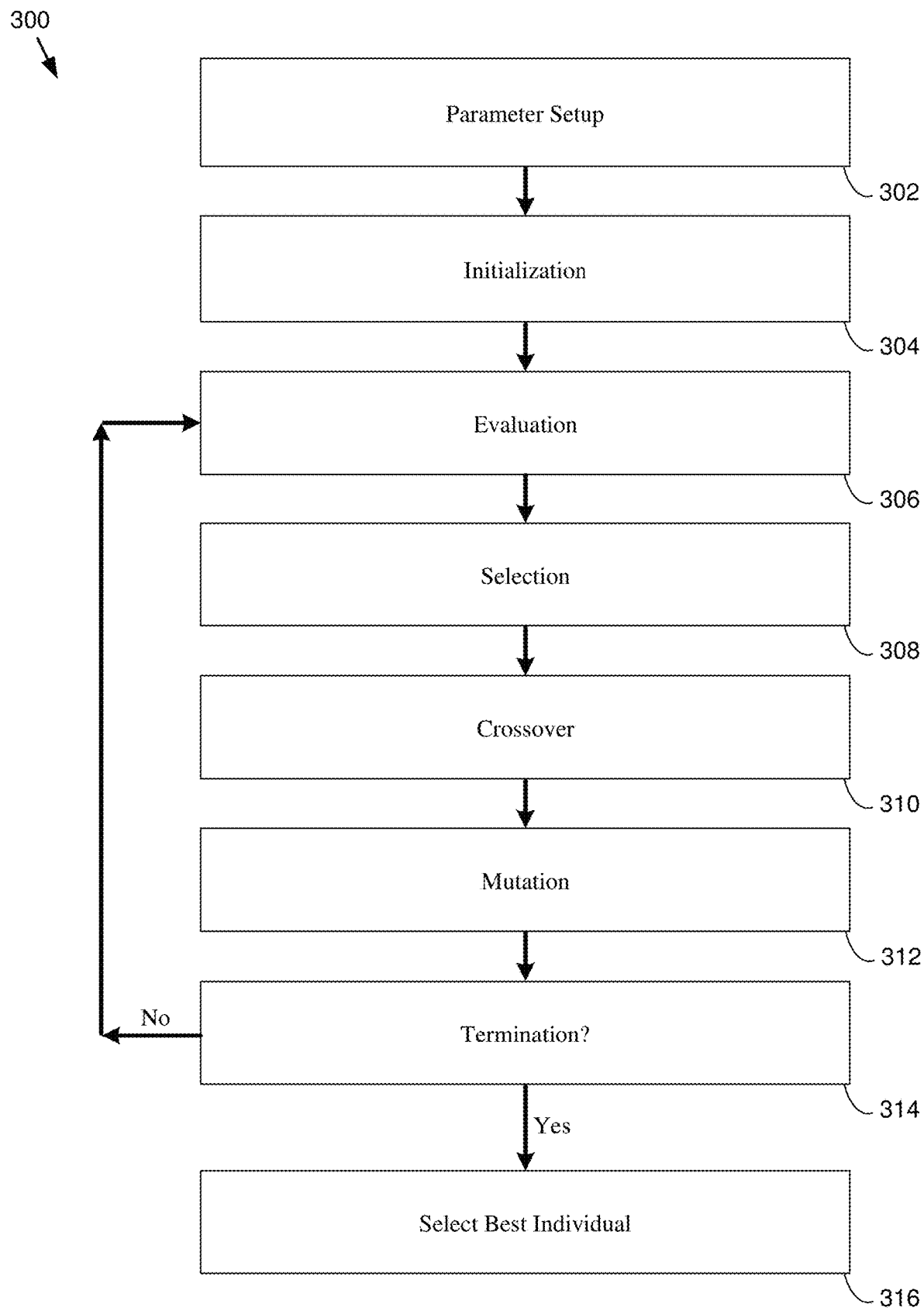
FIG. 3 is a flowchart depicting operations consistent with the placement process in accordance with an embodiment of the present disclosure.

Referring again to FIG. 3, a flowchart 300 consistent with embodiments of placement process 10 is provided. In some embodiments, placement process 10 may include parameter setup 302. At this stage, the mutation rate, crossover rate, number of generations or seconds, populations size, and number of cores may be set. Initialization stage 304 may be used to randomize an initial population, giving each connection a random layer. At evaluation stage 306, the process may calculate the fitness of all individuals based on a congestion metric (e.g. number of crossings, RUDY, neural network, etc.). At selection stage 308, the best individuals may be selected using a tournament based approach. Crossover stage 310 may be used to perform a two point crossover between individuals prior to mutating layer information at mutation stage 312. A determination may be made at termination stage 312 as to whether enough time has passed, desired fitness achieved, or whether a maximum number of generations has been reached. The best design may be selected at selection stage 314 and the results may be exported to EDA application 20.

Genetic optimization is known for its use in optimization problems. Neural networks naturally employ learned information to predict future events. When placing a plurality of devices on an electronic interconnect (routing) can be achieved. However, routing each potential configuration found by genetic optimization is prohibitively expensive. Past configurations can be routed and feature extraction of the design can be used to train a neural net. Features such as layer count, device types, power planes, all play a role in determining appropriate device to device geometric relationships. The trained neural net may then be used in real time to guide the genetic optimizations. By allowing the system to operate in the background, a neural net can be deeply trained to give good predictions of appropriate device to device clearances. In this way, placement process 10 may be configured to use one or more neural nets to guide a genetic optimization. Additionally, embodiments of placement process 10 may also provide the ability to continuously use genetic optimization to train the neural network.

In some embodiments, automatic placement may be performed using a statistical (genetic) optimization process. These algorithms may require a score to be found for each design. Accordingly, a design may be scored by a previously trained neural net. Normal automatic placement uses a static set of constraints provided by the user. Placement process 10 may be configured to allow a neural net to guide the placement and, as such, previous designs may be used to train the net. Thus, past experiences may influence future placements. By allowing the placement algorithm to "self-play", these experiences can be learned in the background.

Current algorithms do not use past designs to score new designs. Therefore, embodiments included herein will have better results, may be trained on specific customer design styles, and placement quality and time are enhanced by adding hardware.

In some embodiments, and as shown in FIG. 4, a design planner or EDA application 20 (such as those available from the Assignee of the present disclosure) may first import a design file containing the physical connectivity information, including, but not limited to, the net list, each component's layout, metadata, etc. EDA application 20 may then automatically place the components using a heuristic to minimize copper usage (e.g., the total length of traces). This placement information may then exported into a format (e.g., JSON) so that placement process 10 may interpret the location of each component's pin. The operations discussed below may then occur using Python or any suitable technique.

Referring now to FIGS. 5-11, examples depicting fully automated operations consistent with embodiments of the present disclosure is provided. In some embodiments, for each power rail of a PCB design, placement process 10 may be configured to determine one or more decoupling capacitors associated with the power rail and determine the power rail's impedance when viewed from the power pins. Placement process 10 may be configured to perform a genetic optimization loop where the type of capacitor and its location are varied until the power rail's impedance is below a target value.

Figure 5:
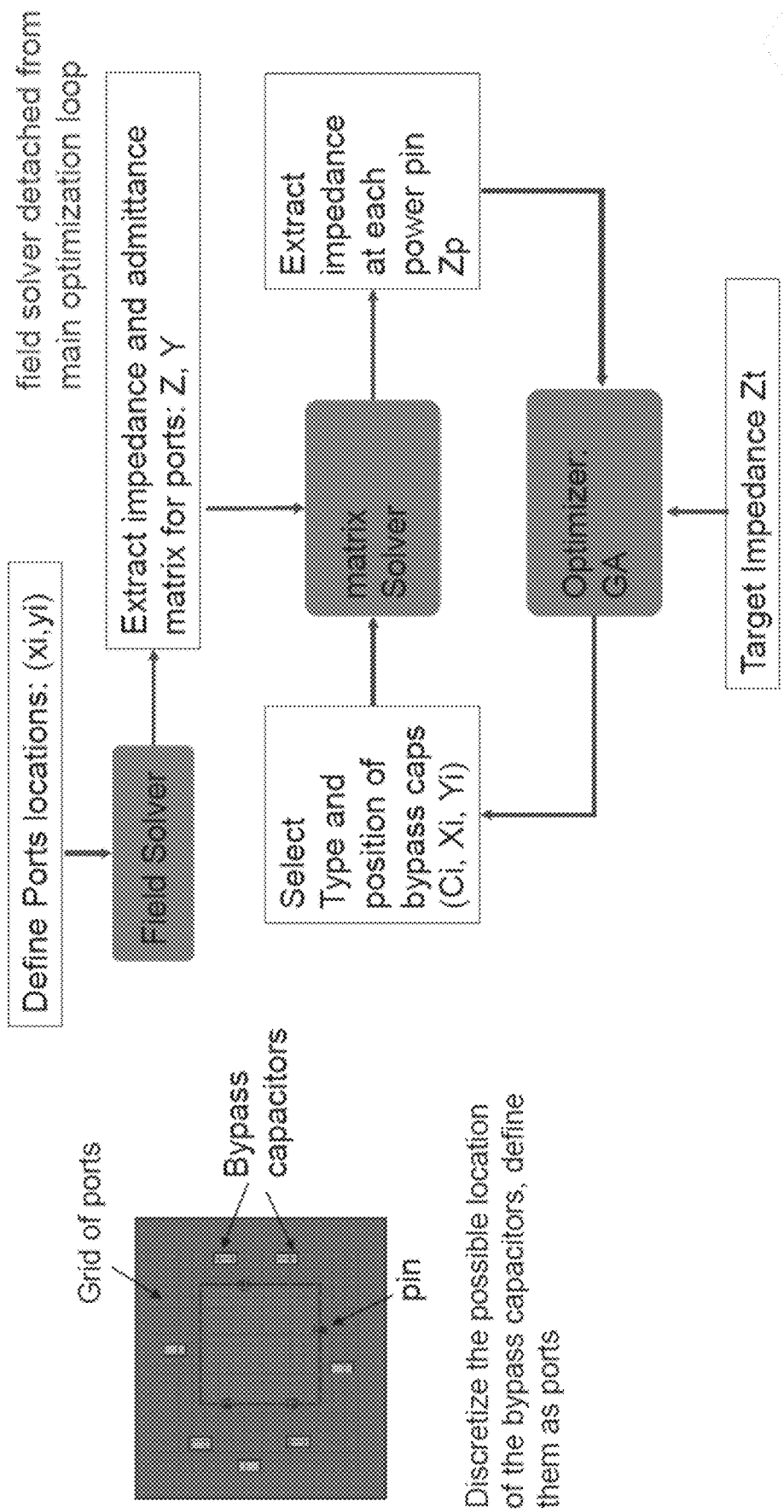
FIG. 5 is a flowchart depicting operations consistent with the placement process in accordance with an embodiment of the present disclosure.
Figure 9:
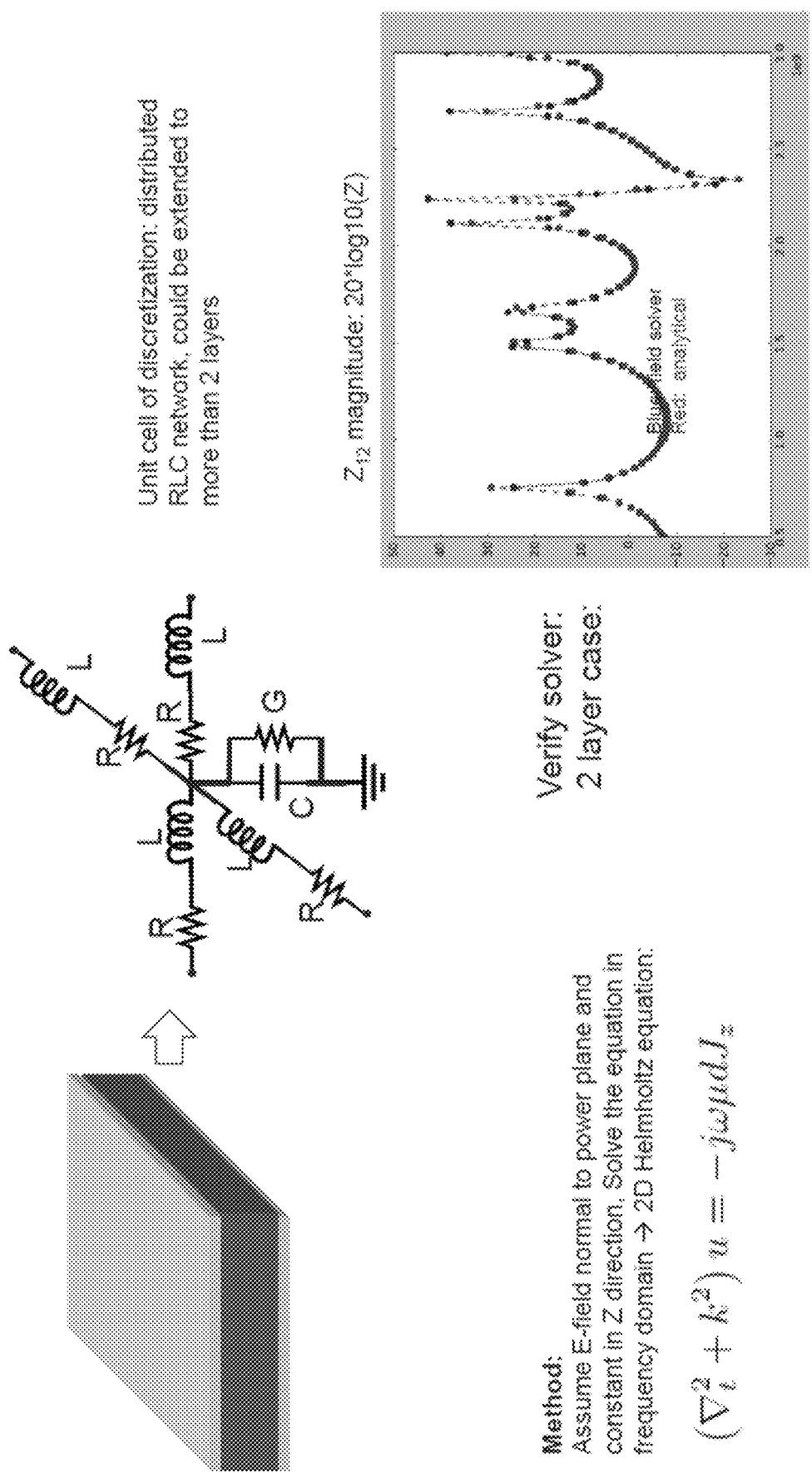
FIG. 9 is a diagram consistent with the placement process in accordance with an embodiment of the present disclosure.

In some embodiments, and referring to FIGS. 5 and 9, placement process 10 may define one or more port locations on a given PCB. These may be selected as the pins connected to the power plane of interest on any components connected to that power rail. Each pin may also have a corresponding closest ground pin location. These pins may be used as ports for calculating the input impedance of the power plane using the field solver. The field solver may be a 2.5D fast frequency domain impedance solver which may provide the Z and Y matrices for the power plane. The field solver may discretize the power plane using a distributed RLC network, an example of which is provided in FIG. 9.

FIG. 9 shows a diagram showing an example of a 2.5D fast frequency domain power planes impedance field solver. Assuming the E-field normal to the power plane is constant, the field solver may then solve the 2D Helmholtz equation in two dimensions as shown in Equation 1 below:

$$(\nabla_t^2 + k^2)u = -j\omega\mu dJ_z \quad \text{Equation 1}$$

In some embodiments, the field solver may be separate from the optimization loop and may only be called once since the power plane geometry does not change when capacitors are varied. The Z and Y matrices from the field solver may be sent to the robust matrix solver which may avoid matrix inversion to maintain numerical stability. From this placement process 10 may obtain the impedance for each power pin on the power plane. The impedance may be sent to the genetic optimizer which may compare it to a target value, for example 0.5Ω. If the impedance is above the target, placement process 10 may vary a parameter available for optimization then repeat the process to determine the impedance and see if this is below the target. This process may repeat until the impedance at each pin is below the target for all frequencies or the maximum number of generations is met. Examples of some of the parameters available for optimization in each run of the loop are shown in Table 1 provided below. Different capacitors may be selected from a library of capacitors with varying capacitance and parasitic resistance and inductance.

TABLE 1

| Parameter | Description | Example value |
| --- | --- | --- |
| Num_caps | Total number of capacitors on the power plane | 25 |
| Num_pop | Total population of capacitors in the library available for selection | 150 |
| Max_gen | Maximum number of generations used for optimization | 30 |
| Xcpb | Overall cross-over probability | 0.2 |
| Mtpb | Overall mutation probability | 0.8 |
| Indpb_xc | Cross-over probability for each gene | 0.3 |
| Indpb_mt_c | Mutation probability for capacitor type genes | 0.1 |
| Indpb_mt_pos | Mutation probability for capacitor position genes | 0.3 |
| Tournsize | Tournament size for genetic selection | 5 |

In some embodiments, and as shown in FIG. 5, placement process 10 may utilize a variety of different solvers. Some of these may include, but are not limited to, a fast field solver and a robust matrix solver. The fast field solver may be a 2.5D fast frequency domain impedance solver and the robust matrix solver may be configured to avoid matrix inversion to maintain numerical stability. The efficiency of these methods allows placement process 10 to run quickly and be fully automated.

Referring again to FIGS. 6-8 provide examples of various types of input parameters. As shown in the figures, various input parameters may be used in accordance with placement process 10. The tables shown in these figures indicate various parameter types, units, meaning, and examples that may be used without departing from the scope of the present disclosure.

Figure 10:
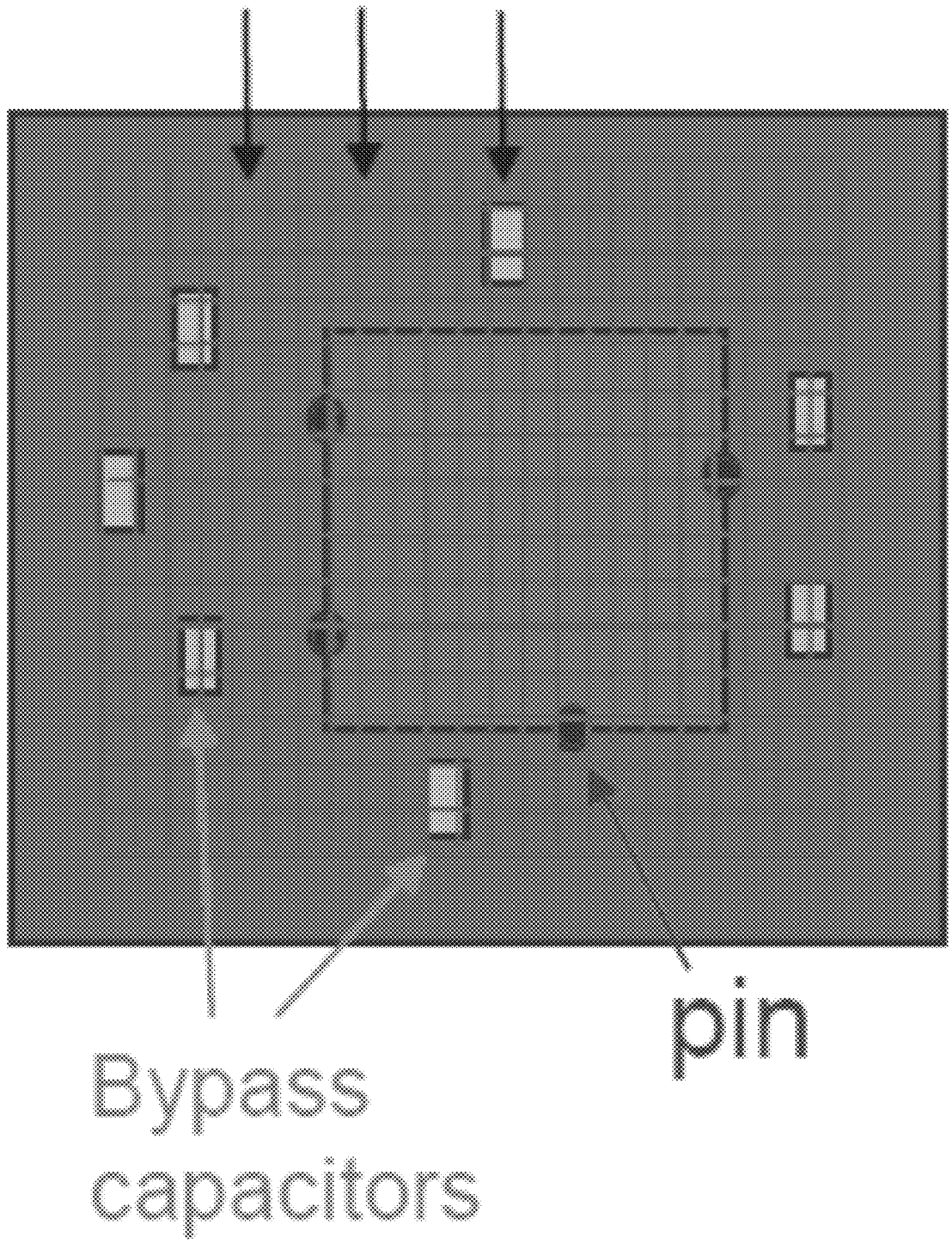
FIG. 10 is a diagram consistent with the placement process in accordance with an embodiment of the present disclosure.

Referring now to FIG. 10, a diagram showing an example robust pin impedance calculation is provided. Generally, solving for input impedance may include:

(1) Using a field solver, first calculate impedance matrix Z on grid of ports: $Z_{ij} = V_i/I_j$, here $I_j$ is the current injected at port j, $V_i$ is the solved voltage at port i.

(2) The corresponding admittance matrix would be Y=inv (Z).

(3) The effect of adding bypass capacitors would be adding a diagonal admittance matrix D to Y: $Y_{new} = Y + D$.

(4) Solve linear equations: $Y_{new}V=I$, here V and I are the voltage and current vector corresponding to all pin locations, after solving this, the input impedance at pin location p is just: $Z_p=V_p/I_p$.

At step (2), placement process 10 may need to invert impedance matrix Z to get admittance matrix Y, which is numerically unstable, especially when there is a large number of ports or a dense grid. In order to overcome this issue, placement process 10 may transform the equation in step (4) by multiply both sides with impedance matrix Z, so it may then be represented by:

$Z(Y+D)V=ZI$, which becomes $(I_E+ZD)V=ZI$, here $I_E$ is identity matrix.

In this example, instead of step (4), placement process 10 may solve this transform linear system, where the inversion of matrix Z is not needed. Accordingly, placement process 10 may shows great numerical stability, and robustly solve for pin impedance in all cases (even with a very dense grid of ports).

Figure 11A:
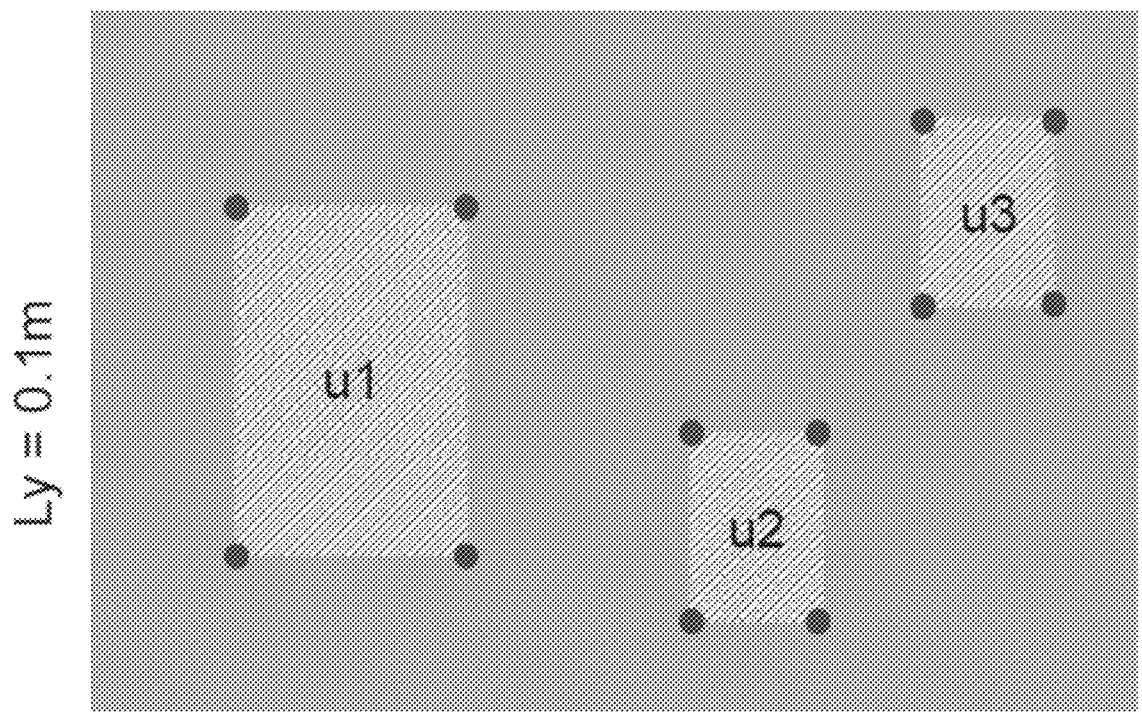
FIG. 11A is a diagram consistent with the placement process in accordance with an embodiment of the present disclosure.
Figure 11B:
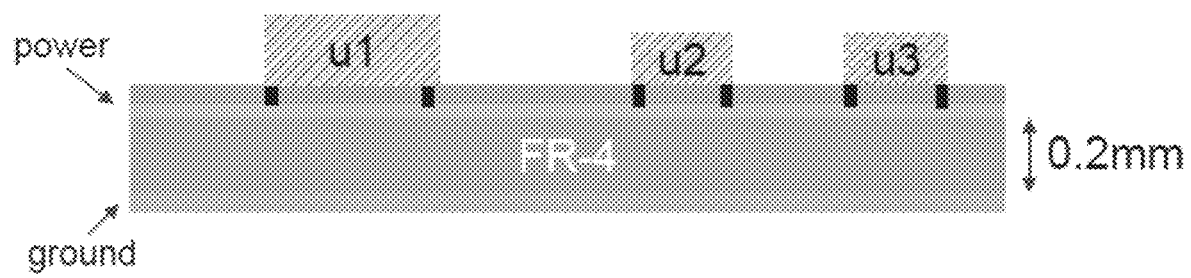
FIG. 11B is a diagram consistent with the placement process in accordance with an embodiment of the present disclosure.

Referring now to FIGS. 11A and 11B, an example showing a two layer power plane, having three components and twelve pins is provided. In this example, a pair of power/ground planes, having three components on the top of the board, each with 4 pins at the corners, totaling 12 pins is provided. Placement process 10 may optimize the input impedance of those pins to be below target impedance, at frequencies of interests. The resonant frequencies of the power plane pair may be calculated, the process may select four of those frequency points where a large input impedance is expected, for example, Freqs=[0.37e9, 0.75e9, 1.12e9, 1.67e9].

Embodiments of placement process 10 may provide numerous advantages over existing solutions. For example, placement process 10 may be fully automated for all power rails on a given electronic design and is configured to provides efficient performance (e.g. running less than one minute for typical electronic designs). The process may also allow users with little to no background knowledge to optimize their power delivery network.

In some embodiments, placement process 10 may provide a fully automated process that uses genetic optimization to select and place capacitors on a PCB to minimize the impedance of each power plane. The efficiency of the matrix solver allows the process to be fully automated. Additionally and/or alternatively, placement process 10 may allow users to view alternative choices explored by the algorithm and the impact on the power plane impedance.

In some embodiments, placement process 10 may improve the power performance of PCBs designed using various EDA applications. Placement process 10 may also potentially save money by eliminating unnecessary capacitors in a PCB design.

In some embodiments, placement process 10 may provide a graphical view of the alternative decoupling capacitor options simulated by placement process 10 so that users can see how the decoupling capacitors optimize the power rail impedance.

It should be noted that although certain embodiments included herein may reference machine learning or genetic algorithms, any analysis process may be used in accordance with the teachings of the present disclosure. For example, any evolutionary algorithm, genetic algorithm, genetic program, grouping genetic algorithm, evolutionary computing approach, metaheuristics, stochastic optimization, optimization approach, artificial intelligence technique, etc. may be used without departing from the teachings of the present disclosure.

It will be apparent to those skilled in the art that various modifications and variations can be made in the embodiments of the present disclosure without departing from the spirit or scope of the present disclosure. Thus, it is intended that embodiments of the present disclosure cover the modifications and variations provided they come within the scope of the appended claims and their equivalents.

What is claimed is:

1. A computer-implemented method for use in an electronic design environment comprising:
   receiving, using at least one processor, a netlist associated with an electronic design;
   performing genetic optimization on a portion of the netlist to identify and place one or more capacitors on a printed circuit board to minimize an impedance associated with a power plane, wherein performing utilizes at least one of a field solver and a matrix solver; and
   displaying, at a graphical user interface, a placement of the one or more capacitors, wherein the placement is based upon, at least in part, the performing.

2. The computer-implemented method of claim 1, wherein performing includes identifying a number of the one or more capacitors.

3. The computer-implemented method of claim 1, wherein performing includes identifying a value of the one or more capacitors.

4. The computer-implemented method of claim 1, wherein performing includes identifying a location of the one or more capacitors.

5. The computer-implemented method of claim 1, wherein performing genetic optimization includes iteratively adjusting a location of the one or more capacitors.

6. The computer-implemented method of claim 1, wherein performing genetic optimization includes iteratively adjusting a type of the one or more capacitors.

7. The computer-implemented method claim 1, wherein displaying includes displaying a plurality of placement options at the graphical user interface.

8. The computer-implemented method claim 1, further comprising:
   defining one or more port locations associated with the electronic design based upon, at least in part, a coordinate grid.

9. A non-transitory computer-readable storage medium having stored thereon instructions that when executed by a machine result in the following operations:
   receiving, using at least one processor, a netlist associated with an electronic design;
   performing genetic optimization on a portion of the netlist to identify and place one or more capacitors on a printed circuit board to minimize an impedance associated with a power plane, wherein performing utilizes at least one of a field solver and a matrix solver; and
   displaying, at a graphical user interface, a placement of the one or more capacitors, wherein the placement is based upon, at least in part, the performing.

10. The non-transitory computer-readable storage medium of claim 9, wherein performing includes identifying a number of the one or more capacitors.

11. The non-transitory computer-readable storage medium of claim 9, wherein performing includes identifying a value of the one or more capacitors.

12. The non-transitory computer-readable storage medium of claim 9, wherein performing includes identifying a location of the one or more capacitors.

13. The non-transitory computer-readable storage medium of claim 9, wherein performing genetic optimization includes iteratively adjusting a location of the one or more capacitors.

14. The non-transitory computer-readable storage medium of claim 9, wherein performing genetic optimization includes iteratively adjusting a type of the one or more capacitors.

15. The non-transitory computer-readable storage medium of claim 9, wherein displaying includes displaying a plurality of placement options at the graphical user interface.

16. The non-transitory computer-readable storage medium of claim 9, further comprising:
   defining one or more port locations associated with the electronic design based upon, at least in part, a coordinate grid.

17. A system for use in an electronic design environment comprising:
   a computing device having at least one processor configured to receive a netlist associated with an electronic design, the at least one processor further configured to perform genetic optimization on a portion of the netlist to automatically identify and place one or more capacitors on a printed circuit board to minimize an impedance associated with a power plane, wherein performing utilizes at least one of a field solver and a matrix solver, the at least one processor further configured to display, at a graphical user interface, a placement of the one or more capacitors, wherein the placement is based upon, at least in part, the performing, the at least one processor further configured to display alternative capacitor placements and an associated impact on power plane impedance.

18. The system of claim 17, wherein performing includes identifying a number of the one or more capacitors,
   enabling N of the at least one capacitor and each of the at least one switch in a peak generation position during maximum peak generation.

* * * * *